United States Patent Office 3,558,565
Patented Jan. 26, 1971

3,558,565
POLYAMIDES FROM OXADICARBOXYLIC ACIDS AND DIAMINES CONTAINING AROMATIC NUCLEUS
Kazuo Saotome, Tokyo, Hiroshi Komoto, Ichikawa-shi, and Kenichiro Sato, Tokyo, Japan, assignors to Asahi Kasei Kogyo Kabushiki Kaisha, Osaka, Japan, a corporation of Japan
No Drawing. Continuation-in-part of application Ser. No. 749,927, July 31, 1968, which is a continuation of application Ser. No. 405,840, Oct. 22, 1964. This application Oct. 7, 1969, Ser. No. 864,891
Claims priority, application Japan, Nov. 5, 1963, 38/59,219; Feb. 13, 1964, 39/7,366; 39/7,367; Mar. 26, 1964, 39/16,483
Int. Cl. C08g 20/00
U.S. Cl. 260—78                                           5 Claims

ABSTRACT OF THE DISCLOSURE

Novel polyamides melting between 190° and 220° C., having an intrinsic viscosity of 0.5 or more when measured in m-cresol at 25° C. and being of the formula:

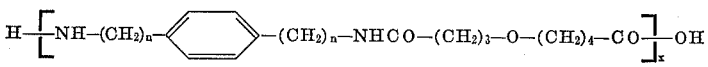

wherein $n$ is 1 or 2 and $x$ is the degree of polymerization.

CROSS REFERENCE TO RELATED APPLICATIONS

This is a continuation-in-part of co-pending application Ser. No. 749,927, filed July 31, 1968 which is a streamlined continuation of Ser. No. 405,840, filed Oct. 22, 1964, which are both now abandoned.

BACKGROUND OF THE INVENTION

Field of the invention

This invention relates to polyamides derived from dicarboxylic acids and diamines containing an aromatic nucleus.

Description of the prior art

Carothers, U.S. Pat. No. 2,191,556 discloses polyamides derived from symmetrical oxydicarboxylic acids and aromatic diamines. These polyamides have too high a melting point to permit easy fiber formation and/or spinning.

SUMMARY OF THE INVENTION

There are provided novel polyamides melting between 190° and 220° C. and having intrinsic viscosities of 0.5 or more. The polyamides result from the polycondensation of 5-oxasebacic acid and p-xylylenediamine or p-bis-(2-aminoethyl)-benzene.

DETAILED DESCRIPTION

This invention relates to new polyamides and more particularly, to polyamides of the formula:

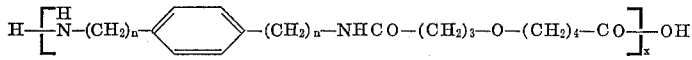

wherein $n$ is 1 or 2 and $x$ is the degree of polymerization. The polyamides have a melting point of from 190° to 220° C. and an intrinsic viscosity of 0.5 or more, preferably from 0.5 to 2.0 and more preferably from 0.90 to 1.28 when determined in m-cresol at 25° C.

It is well known that polyamides containing aromatic groups can be prepared by polycondensing aromatic symmetrical diamines such as p-xylylenediamine and p-bis-(2-aminoethyl)-benzene with aliphatic dicarboxylic acids such as sebacic acid and adipic acid. However, such polyamides have such high melting points, that is, close to their decomposition points that it is difficult to work them, for instance, in melt-spinning. Accordingly their practical uses are limited. For example, the polyamide prepared from p-xylylenediamine or p-bis-(2-aminoethyl)-benzene which have relatively low melting points and sebacic acid has a melting point of about 300° C. and consequently has poor workability.

The object of this invention is to provide new polyamides having a relatively low melting point i.e., 190°–220° C. and good workability.

It has now been found that the oxy-dicarboxylic acid 5-oxasebacic acid of the formula:

$$\text{HOOC—(CH}_2\text{)}_3\text{—O—(CH}_2\text{)}_4\text{—COOH}$$

can be prepared in high yields by reacting δ-valerolactone with γ-butyrolactone in the presence of caustic alkali.

It has been further found that new polyamides of the Formula I above can be prepared by the polycondensation of the above dicarboxylic acid containing an ether linkage with a diamine of the formula:

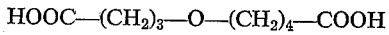 (II)

wherein $n$ is 1 or 2, the said polyamides having a melting point of 190°–220° C. preferably 215°–220° C. when $n$ is 1 and 190°–195° C. when $n$ is 2; and excellent workability, for instance, upon melt-spinning.

The above-described reaction can be illustrated by the following equations:

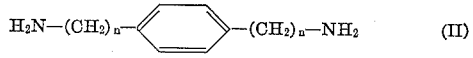

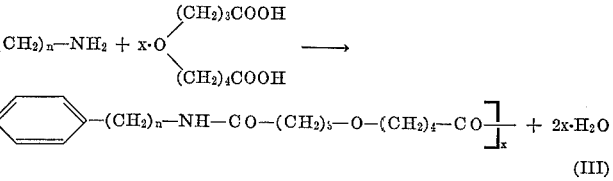

(III)

Hereinafter this invention will be explained in detail. When a diamine of the Formula II and 5-oxasebacic acid are mixed in equimolar amounts in a suitable solvent such as an alcohol, crystals of a so-called nylon salt are separated out. This nylon salt is recrystallized and purified using a suitable solvent such as water and alcohols. Alternatively, the above compound (II) and the acid in equimolar amounts are added to water and the pH of the aqueous solution is adjusted to the neutralizing point to form an exact equimolar composition of the compounds. Then, either the nylon salt or the aqueous solution as the case may be is heated at 200°–300° C. under an inert gas at atmospheric or reduced pressure while distilling off water. Thus the polycondensation represented by the Formula III proceeds and the novel polyamide is produced. The obtained polymer has a molecular weight of 10,000–30,000 and a melting point of 190°–220° C. and is a milk-white hard solid.

Usually, in the above polycondensation reaction, a small amount of a mono-carboxylic acid such as acetic acid or an amine compound is added as a molecular weight regulator. These monofunctional substances form inert terminal groups on the polymer molecule in the polycondensation and regulate the molecular weight of the produced polymer in desired order.

Since all of the monomer components to be used in this process are nonvolatile, it is easy to prevent vaporizing loss of materials under reduced pressure operations and to carry out the polycondensation.

When the polymer is melt-spun at a temperature of 260°–300° C., it shows excellent fiber forming properties and produces a fiber which can be cold-stretched. The stretched fiber has very excellent properties.

The diamines used to prepare the instant polyamides are p-xylylenediamine and p-bis-(2-aminoethyl)-benzene, and the oxydicarboxylic acid is 5-oxasebacic acid.

The new polyamides according to this invention have a greater modulus of elasticity and are superior in thermal stability and particularly in weather resistance to those of the well known aliphatic polyamide such as nylon 6, nylon 66 and the like. For instance, even if the polymer is heated and melted in air, discoloration hardly occurs and the polymer is stable for a considerable period of time. This is a prominent feature which cannot be seen in other conventional polyamides. Further, fibers obtained from the instant polymer are superior in dyeability to the conventional nylons, and particularly shows prominent dyeing affinity to disperse dyes. It is considered that these improved physical properties are due to the coexistence of a benzene ring and an asymmetrical ether linkage in the main chain of the polyamide polymer molecule.

Besides the process above mentioned, esters of the above acid may be reacted with the diamine to cause polycondensation by dealcoholation to produce the same polymer.

Alternatively, according to the so-called interfacial polycondensation method, the acid chloride instead of the free acid may be reacted with the diamine to give the same polymer.

It is also possible that by using a mixed system in which a major part consists of the diamine monomer and the dicarboxylic acid monomer and a minor part consists of monomer components of other well known polyamides such as aliphatic lactams, organic dicarboxylic acids, organic diamines, ω-amino carboxylic acid and the like and heating said system in such a condition as amino groups and carboxylic groups in the system are maintained at a approximately equimolar ratio, so-called copolycondensation reaction is carried out to produce a copolymerized polyamide.

These copolymerized polyamides, in which at least one well known polyamide monomer component is added, have the aforementioned improved physical properties depending on their compositions.

In order to illustrate the present invention, some examples will hereinafter be given.

Parts are expressed in terms of parts by weight.

EXPERIMENT 1

When 68 parts of p-xylylene-diamine and 109 parts of δ,δ'oxy-divaleric acid respectively in 10% alcohol solution were mixed together, crystals of a nylon salt were precipitated. Separating the crystals by filtration, a nylon salt having a melting point of 173° C. was obtained with approximately the theoretical yield. The nylon salt was heated under a nitrogen gas stream at 230°–240° C. for 2 hours to distill off the water produced. Then the salt was sealed in a tube under reduced pressure and heated at 280° C. for 2 hours to carry out the polycondensation reaction. The polymer produced by the reaction has a melting point of 240°–244° C. and its infrared absorption spectrum confirms a polyamide structure containing ether linkages. The nitrinsic viscosity determind in m-cresol as solvent at 25° C. was 1.46.

EXPERIMENT 2

68 parts of p-xylylene-diamine and 95 parts of γ,γ'-oxy-dibutyric acid were dissolved in 250 parts of water. The pH of the aqueous solution was 6.90. From the aqueous solution, water was distilled off. The remaining mixture was heated under a nitroben gas stream at 230° C. for 30 minutes, further heated at 260° C.–270° C. for 3 hours and finally heated at the same temperature for 30 minutes at a pressure of 3 mm. Hg to carry out the reaction. The polymer obtained has a melting point of 245°–248° C. and intrinsic viscosity of 1.08 determined in m-cresol at 25° C.

EXPERIMENT 3

When 82 parts of p-bis-(2-aminoethyl)-benzene and 109 parts of δ,δ'-oxy-divaleric acid respectively in 15% alcohol solution were mixed together and allowed to stand for some time, crystals of nylon salt were precipitated. The crystals were separated by filtration and further recrystallized from water-alcohol for purification. The melting point of the salt was 160° C. The nylon salt was heated under a nitrogen gas stream at 240° for 2 hours. Dehydration reaction occurred and a polymer was produced. The substance was further heated at 270°–280° C. under a nitrogen gas stream at atmosphereic presure for 3 hours to continue the reaction. The polymer produced in the reaction has a melting point of 225°–230° C. and intrinsic viscosity of 1.08 determined in m-cresol at 25° C.

EXPERIMENT 4

By mixing 82 parts of p-bis-(2-amino-ethyl)-benzene and 95 parts of γ,γ'-oxy-dibutyric acid respectively in 15% alcohol solution, nylon salt (melting point 184° C.) was obtained. By carrying out polycondensation of the nylon salt as in Experiment 3, a polyamide was obtained. The polyamide has a melting ponit of 245°–250° C. and intrinsic viscosity of 1.01 determined in m-cresol at 25° C.

EXAMPLE 1

When 68 parts of p-xylylene-diamine and 102 parts of 5-oxa-sebacic acid respectively in 15% alcohol solution were mixed together and allowed to stand for some time, crystals of nylon salt were precipitated. The production of the nylon salt was theoretical. The nylon salt was recrystallized from water-alcohol solution for further purification. The melting point of the resulting salt was 182°–182.5° C. The nylon salt was heated under a nitrogen gas stream at atmosphereic pressure at 230° C. for 1.5 hours, further at 270°–280° C. for 1 hour, and finally at the same temperature but under reduced pressure of 5 mm. Hg for 30 minutes, to carry out reaction. The polymer produced in the reaction has a melting point of 215°–220° C. and an intrisic viscosity of 1.28 when determined in m-cresol at 25° C.

EXAMPLE 2

By mixing 82 parts of p-bis-(2-aminoethyl)-benzene and 102 parts of 5-oxa-sebacic acid respectively in 15% alcohol solution, the corresponding nylon salt (melting point 192° C.) was obtained. 120 parts of the nylon salt were heated under a nitrogen gas stream at 240° C. for 2 hours while distilling off water, and then heated at 275° C. under reduced pressure of 10 mm. Hg for 1 hour to carry out the reaction. The polymer produced in the reaction has a melting point of 190°–195° C. and intrinsic viscosity of 1.24 when determined in m-cresol at 25° C.

EXAMPLE 3

The procedure of Example 1 was repeated, except that the starting mixture further contained acetic acid in an amount of 1/100 mole per mole of the diamine to obtain a polymer having a melting point of 215° to 220° C. and an intrinsic viscosity of 0.92 when determined in m-cresol at 25° C.

EXAMPLE 4

The procedure of Example 2 was repeated, except that the starting mixture further contained acetic acid in an amount of 1/100 mole per mole of the diamine to obtain a polymer having a melting point of 190° to 195° C. and an intrinsic viscosity of 0.90 when determined in m-cresol at 25° C.

In summary, the present polyamides are characterized by the presence of the asymmetrical ether linkage resulting from the 5-oxasebacic acid. U.S. Pat. 2,191,556 (Carothers) discloses the possibility of the production of polyamides from the combination of the present diamines and certain symmetrical oxydicarboxylic acids such as $$HOOC-(CH_2)_3-O-(CH_2)_3-COOH$$

and $$HOOC-(CH_2)_4-O-(CH_2)_4-COOH$$

though said U.S. patent has no specific mention that said polyamide has in fact been synthesized. However, the present polyamides containing the asymmetrical ether linkage have certain unexpected and advantageous properties as compared with those of Carothers. The melting points of the polyamides the possibility of the production of which is disclosed by Carothers (those resulting from symmetrical oxy-dicarboxylic acids), are much higher than those of the present invention and in fact lead to polyamides which have certain disadvantages. The present polyamides (M.P. 190°–220° C.) have good processability which is absent from those of Carothers.

To substantiate the foregoing, certain experiments were conducted as follows:

(I) Method of experiment (A) *Preparation of polyamide.*—Equimolar ethanol solutions of a diamine and a dicarboxylic acid at a concentration of 10% were mixed together, and the resulting solution was refluxed for 0.5 hour. After being cooled with ice water, the precipitated salt was filtered, washed with ether and dried. The yield of the nylon salt was quantitative. A few grams of the produced nylon salt was sealed in a glass tube under reduced pressure. The glass tube was heated in an oil bath at a temperature of 230° to 260° C. for two hours and then opened, and the contents were heated at a temperature of 250° to 300° C. for one hour in a stream of nitrogen and then for an additional 0.5 hour under a reduced pressure of 1 mm. Hg to complete the reaction. The obtained polymer was a white, hornlike solid.

(B) *Melting point of polymer.*—The melting point of the polymer was measured by observing particles of the produced polymer between crossed Nicol polarizers under an electrically heated hot-stage microscope. The melting point was taken as the temperature at which the last trace of birefringent crystallinity disappeared.

(C) *Reduced viscosity.*—The polyamide was dissolved in m-cresol at a temperature of 60° to 80° C. for two hours with the use of a magnetic stirrer. A solution of 0.5% concentration was subjected to viscosity measurement of 25° C.

(D) *Glass transition temperature.*—The glass transition temperature, $T_g$, was determined on small film strips in an apparatus designed to measure the dynamic modulus of elasticity (for a resonant vibration frequency of 110 c.p.s.) as a function of temperature. The point at which the maximum loss modulus was observed was taken as $T_g$. To check the $T_g$ values obtained by the above method, dilatometric measurement for several polyamide samples were carried out. The results of the two different methods were in good agreement.

(II) Results

The results obtained are as shown in Table 1.

TABLE 1

| Run No. | Starting materials | | Melting point of polyamide, °C. | Reduced viscosity, $\eta_{sp}/C$ | Glass transition temperature, °C. |
|---|---|---|---|---|---|
| | Diamine | Dicarboxylic acid | | | |
| 1 | p-xylylenediamine | HOOC(CH₂)₃O(CH₂)₄COOH (asymmetric) | 217 | 0.78 | 62 |
| 2 | p-bis-(2-aminoethyl)-benzene | Same as above | 197 | 0.94 | 60 |
| 3 | p-xylylenediamine | HOOC(CH₂)₃O(CH₂)₃COOH (symmetric) | 246 | 0.58 | 78 |
| 4 | do | HOOC(CH₂)₄O(CH₂)₄COOH (symmetric) | 242 | 0.86 | 74 |
| 5 | p-bis-(2-aminoethyl)-benzene | HOOC(CH₂)₃O(CH₂)₃COOH (symmetric) | 245 | | 72 |
| 6 | do | HOOC(CH₂)₄O(CH₂)₄COOH (symmetric) | 228 | | 70 |

(III) Discussion

As seen from the above results, the polyamides of Run Nos. 3 to 6 have much higher melting points than the polyamides of Run Nos. 1 and 2 (i.e., the present invention). Therefore, the polyamides of Run Nos. 3 to 6 are more difficult to spin than the claimed polyamides. Further, the glass transition temperatures of the polyamides of Run Nos. 1 and 2, i.e., the present invention are much lower than those of the other conventional polyamides, and hence the fibers produced from the polyamides of Run Nos. 1 and 2 have better physical properties, such as modulus of elasticity, mechanical loss and the like, as well as thermodynamical properties, than the fibers obtained from the conventional polyamides.

In view of the foregoing data, the instant claims are restricted to polyamides falling within the relatively narrow range of melting points and viscosities.

Moreover, on purely theoretical considerations the present polyamides possess properties which are wholly unexpected. Specifically, attention is directed to Table 1 above.

In Table 1 there is seen for Run Nos. 1 and 2 the melting points of polyamides produced by the polycondensation of 5-oxasebacic acid with p-xylylene-diamine and p-bis-(2-aminoethyl)-benzene respectively.

Considered next, Run Nos. 3 and 4 show the production of polyamides from p-xylene-diamine and symmetric dicarboxylic acids having 6 to 8 methylene groups respectively. The melting points for the resulting polyamides are 246° C. and 242° C. respectively. It is urged that it would be expected that the use of an asymmetric acid having seven methylene groups (5-oxasebacic acid) would yield a polyamide having a melting point approximately midway between the acids of Run Nos. 3 and 4. However, unexpectedly, the melting point of such a polyamide as shown in Run No. 1 is 27° C. less than the average of the melting points of the polyamides of Run Nos. 3 and 4, i.e.

$$\frac{246+242}{2}=244$$

244° C.—217° C.=27° C. This is a substantial and unobvious departure from the melting point values given in Run Nos. 3 and 4.

In a similar manner it can be demonstrated that the polyamide produced with the asymmetric 5-oxasebacic acid and the other diamine, p-bis-(2-aminoethyl)-benzene, also results in a reduction in the melting point of the polyamide. Thus, Run No. 2 shows a polyamide melting at 197° C. as compared to Run Nos. 5 and 6 which disclose polyamides melting points of 245° C. respectively.

On an average the melting point is reduced 40° C. i.e.

$$\frac{245+228}{2}=237$$

237° C.—197° C.=40° C., by use of the asymmetric acid. This too is a substantial and unobvious departure from the melting point values given in Run Nos. 5 and 6.

We claim:
1. A polyamide melting between 190° and 220° C., having an intrinsic viscosity of 0.5 or more when measured in m-cresol at 25° C. and being of the formula:

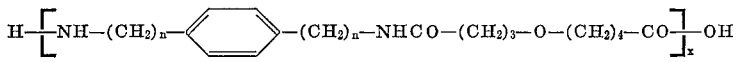

wherein $n$ is 1 or 2 and $x$ represents the degree of polymerization.

2. A polyamide as claimed in claim 1 wherein the intrinsic viscosity is 0.5 to 2.0.
3. A polyamide as claimed in claim 2 wherein the intrinsic viscosity is 0.90 to 1.28.
4. A polyamide as claimed in claim 1 wherein $n$ is 1, and the polyamide melts at 215°–220° C.
5. A polyamide as claimed in claim 1 wherein $n$ is 2 and the palyamide melts at 190°–195° C.

References Cited
UNITED STATES PATENTS

| | | | |
|---|---|---|---|
| 2,130,958 | 9/1938 | Carothers | 260—78 |
| 2,191,556 | 2/1940 | Carothers | 260—78 |
| 2,623,031 | 12/1952 | Snyder | 260—861 |

OTHER REFERENCES

Floyd—Polyamide Resins, second edition, pp. 44–47 (1966).

HAROLD D. ANDERSON, Primary Examiner

U.S. Cl. X.R.

260—33.4; 264—176